United States Patent [19]

Beckers

[11] 3,870,323

[45] Mar. 11, 1975

[54] CHUCK

[75] Inventor: Heinz Beckers, Viersen, Germany

[73] Assignee: Paul Forkardt Kommanditgesellschaft, Dusseldorf, Germany

[22] Filed: Aug. 20, 1973

[21] Appl. No.: 389,590

[30] Foreign Application Priority Data
Aug. 19, 1972 Germany............................ 2240871

[52] U.S. Cl. ............................................. 279/112
[51] Int. Cl. ........................................... B23b 31/16
[58] Field of Search ........... 279/112, 113, 114, 115, 279/117, 121, 110

[56] References Cited
UNITED STATES PATENTS

| | | | |
|---|---|---|---|
| 3,606,364 | 9/1971 | Benjamin et al. .................... | 279/121 |
| 3,656,773 | 4/1972 | Blattry et al. ........................ | 279/112 |

*Primary Examiner*—Gil Weidenfeld
*Attorney, Agent, or Firm*—Walter Becker

[57] ABSTRACT

A chuck for turning machines with radially movable clamping jaws normally engaged by an adjusting member therefor which latter is movable in the chuck body to a first section of its path of movement which first section represents the working range of the adjusting member for engagement with and adjustment of the pertaining clamping jaw and is also movable to a second section of its path of movement outside its working range to disengage the respective pertaining clamping jaw so as to allow removal and exchange of the latter. Each clamping jaw has associated therewith a holding pin displacable in the chuck body and operable automatically in response to the movement of the adjusting member to the second section to engage the pertaining clamping jaw while locking means respectively associated with the holding pins automatically lock the pertaining holding pins in their clamping jaw engaging position, thereby positively preventing the respective clamping jaws from moving until the respective adjusting member is moved back into its working range.

5 Claims, 3 Drawing Figures

CHUCK

The present invention relates to a chuck for turning machines with clamping jaws which are radially movable and which are separable from a driving element in one final position for removal from the chuck body.

With those chucks which are known in the art and in which the jaw assemblies are removable from the chuck body and permit an interchange or replacement of the jaws, the movement of the driving element is possible beyond the path necessary for the loosening or separation, towards an additional path, so as to allow separation of the clamping jaws from the driving element. As soon as the driving element has covered this additional path, it is no longer in contact with the clamping jaws, so that the latter can be radially removed from the chuck body and replaced with other jaw assemblies.

The danger with these known chucks which have removable clamping jaws is that the clamping jaws, when they are not engaging the driving element, fly out from the chuck body if the operator, contrary to instructions, brings about or permits rotation of the shaft which carries the chuck. This could result in serious accidents.

In order to avoid this type accident and to produce a chuck whose clamping jaws by means of an additional holding member can automatically be arrested in the position separated from the driving element, and which can only deliberately be released for the desired individual removal of the jaws by hand, it is known to associate with each clamping jaw a holding pin which is displaceably guided in the chuck body. This holding pin is, in view of the movement of the driving element, displaceable on the supplementary path into the path of the clamping jaw and transverse to the direction of movement of the clamping jaw by means of a spring and is retractable out of contact with the clamping jaw by moving the driving element back into the path section which serves for the clamping and loosening operation. In connection therewith, a locking member is associated with every holding pin, which locking member is manually operable for retracting the locking member from engagement with the clamping jaw. This known chuck has, in practice, proven to be very satisfactory.

It is therefore an object of the present invention to improve the above described type of chuck.

It is a further object of the present invention to make the holding pins in such a way that they can be used at the same time for presetting the clamping jaws.

These and other objects and advantages of the invention will appear more clearly from the following specification in connection with the accompanying drawings, in which.

Figure 1:
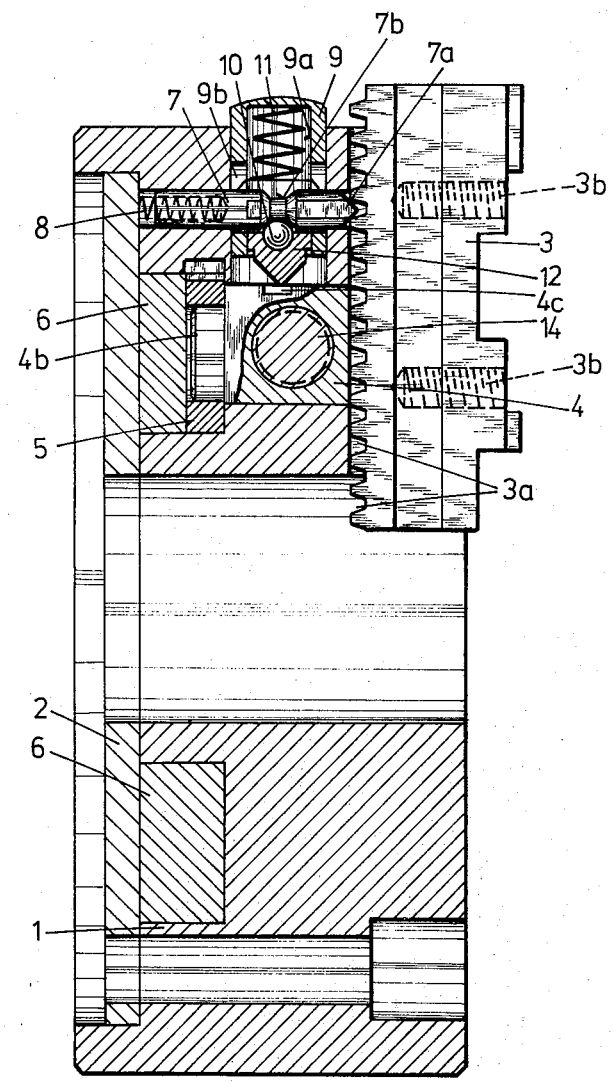
FIG. 1 shows a longitudinal section of a chuck according to the invention.

The chuck according to the present invention is characterized primarily in that the locking member extends over the holding pin and is provided with a longitudinal bore in which are arranged two balls with a diameter corresponding approximately to the radius of the longitudinal bores. In the locking position, the balls engage a groove in the holding pin. To return the holding pin, the balls are transferable respectively into lateral recesses in the inner wall of the locking member.

According to a further feature of the invention, a compression spring is arranged between the radially outer end of the locking member and the balls, the latter resting against a push rod. In this way, a constant engaging of the balls in the groove of the holding pin will be assured. The balls are disengaged from the holding pin only when the locking member is manually pushed, against the thrust of the compression spring, into the chuck body, so that the balls can enter the recesses provided therefor in the inner wall of the locking member.

In order to obtain an automatic release of the locking mechanism between locking member and holding pin in the region of the passage section which serves for the clamping and separating operation, the driving element is, according to a further feature of the invention, in the region of the passage section for the clamping and separating operations, provided with a groove for each push rod respectively. The push rod withdraws into this groove when, by means of the roof-shaped slant of the annular groove of the holding pin, the push rod is pushed automatically inwardly by means of the balls with the clamping movement of the clamping jaws.

To simplify the manufacture of the holding pin and the locking member, it is furthermore proposed, according to the invention, to design not only the grooves of the holding pin but also the recesses of the locking member as a circular annular groove in the mantle surface of the essentially cylindrical holding pin or in the inner wall of the sleeve-shaped locking member.

The construction of the connection between holding pin and locking member according to the invention has over the heretofore known type the advantage of exerting lower frictional forces, being made of fewer individual pieces, and being easier to manufacture as well as being better to mount. By spring loading the holding pin, which is beveled at its forward end, the pin may be used at the same time as stop or drop-in pin for presetting the clamping jaws. In this way, the locating of the proper jaw position prior to the coupling of the jaws with the driving member is substantially simplified, and the installation of supplemental drop-in pins or locking pins becomes superfluous.

Referring now to the drawings in detail, the arrangement shown therein comprises a chuck body 1 which has three radial guiding grooves 1a (FIG. 2) for the reception or insertion of base jaws 3, which are respectively provided with two tapped or threaded holes 3b for fastening auxiliary jaws (not illustrated). Behind every base jaw 3, a key rod 4 is in a direction transverse to the base jaw 3 slidably guided, in a tangential groove of the chuck body. Upon a portion of that surface which faces the base jaw 3, each key rod 4 has slanted key rod teeth 4a (FIG. 2), which fit in or correspond to the spaces between teeth 3a on the back side of the base jaw 3.

Each key rod 4 is provided on its back side with a cylindrical pin 4b which is parallel to the axis of rotation of the chuck. A slide ring 5 is rotatably mounted upon the pin 4b and is by means of parallel, plane surfaces located in a radial groove 6a (FIG. 2) of a thrust ring 6 concentrically and rotatably mounted in the chuck body 1. These parts of the chuck, designated as a key rod chuck, are held in the chuck body 1 by means of a cover 2.

A holding pin 7 is longitudinally displaceably guided in the chuck body 1 behind every base jaw 3 in a bore parallel to the axis of rotation of the chuck. The forward end of the holding pin 7 is formed by a tip or point 7a, which is pressed into a tooth space of the teeth 3a of the base jaw 3 by means of a spring 8 which is partially inserted into the holding pin 7 and is braced against the cover 2. The tip 7a of the holding pin 7 accordingly normally engages the tooth spaces of the teeth 7a. However, if the holding pin 7 is not locked in its advanced position, the tip 7a may, because of its slanted surfaces, be pushed back against the thrust of the spring 8 by means of a radial movement of the base jaw 3.

Figure 2:
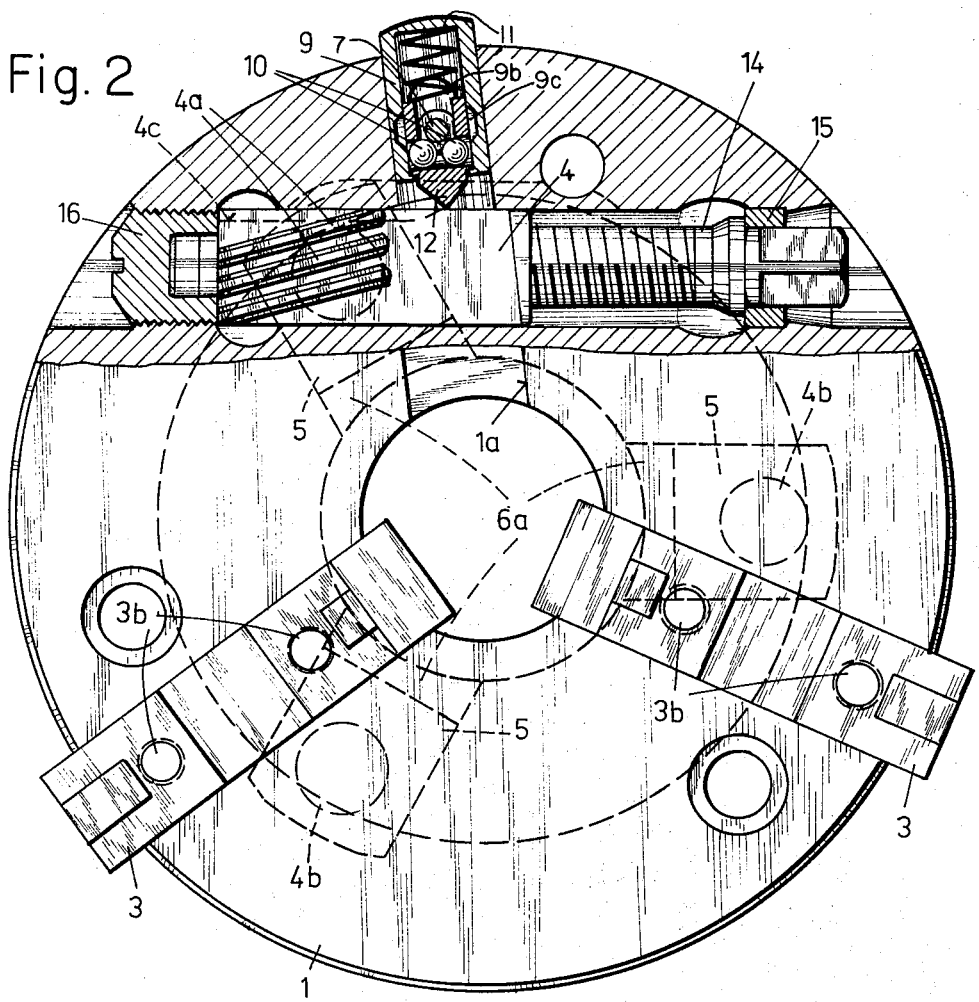
FIG. 2 is a front view, partly in section, of a chuck according to the invention.
Figure 3:
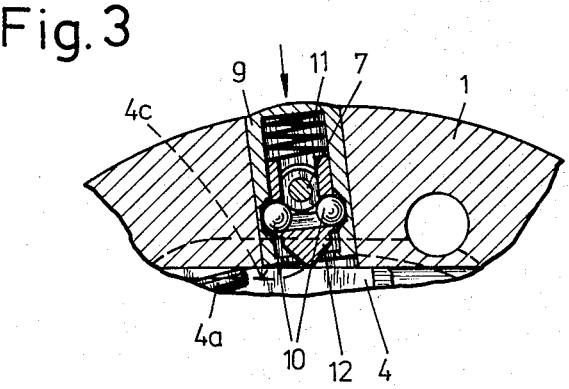
FIG. 3 shows a section of the chuck according to the invention taken through the locking member of FIG. 2, though shown here in a released position.

This locking of the holding pin 7 in the advanced position as shown in FIG. 1, is achieved by means of two balls 10, which are arranged within a sleeve-shaped locking member 9. This locking member 9 is provided with a longitudinal bore 9a as well as with two slots 9b which extend in a tranverse direction and through which the holding pin extends. Above, that is, radially beyond the holding pin 7 which penetrates the locking member 9, a compression spring 11 is arranged in the longitudinal bore 9a. The spring 11 is braced or supported at its radially outer end on the bottom of the longitudinal bore 9a, and at its other end on a push rod 12. The latter is slidably guided in the longitudinal bore 9a of the locking member 9 and by means of a point is braced against or rests upon the key rod 4. As shown in FIGS. 2 and 3, the balls 10 are located in bores of the forked-shaped push rod 12, so that in this manner they are loaded centripetally by the compression spring 11.

The locking between the locking member 9 and the holding pin 7 is achieved by means of the balls 10, which engage an annular groove 7b of the holding pin 7. In order to bring about a release, the balls 10 can enter a recess 9c (FIG. 2), which is formed as an annular groove in the inner wall of the locking member 9. In addition to the release resulting from manually pressing the locking member 9 inwardly against the thrust of the compression spring 11, there is provided a second released position. This released position is realized by pushing the point of the push rod 12 into a longitudinal groove 4c which is formed in every key rod 4 in the region of the passage section employed for the clamping and releasing operation. Since the longitudinal groove 4c is located within the working region, the push rod 12 is pushed radially inward by means of the slants of the annular groove 7b by the balls 10 when the holding pin 7 retracts during the movement of the clamping jaws within the working range.

FIGS. 1 and 2 show one locked position of the holding pin 7 in one tooth space of the teeth 3a of the base jaw 3. These positions can only be achieved and intentionally released by manually pushing the locking member 9 down. Normally, the position shown in FIGS. 1 and 2 prevents the base jaw from flying out of its guiding groove 1a when the chuck is accidentally rotated. This is true even if the key rod teeth 4a are not engaging the teeth 3a of the base jaw 3.

In order to be able to take the base jaw 3 out of the chuck body 1 from this position, which represents the position for changing the chuck jaws and which was realized by an additional path section of the driving member, it is merely necessary to push the locking member 9 into the chuck body 1 in the direction of the arrow as shown in FIG. 3. With this pushing in of the locking member 9 into the chuck body 1, the recesses 9c of the locking member 9, which recesses 9c were covered during the locking position, arrive in the region of the balls 10. The balls can then enter into the recesses 9c as illustrated in FIG. 3.

During insertion of other clamping jaws, the spring loaded holding pins engage the teeth 3a, so that locating the correct jaw position is simplified. In this connection, it is merely necessary to push the respective locking member 9 against the thrust of the compression spring 11 into the chuck body 1. As soon as the desired jaw position is reached, the locking member 9 is released. This brings about or causes the balls 10 to engage the annular groove 7b of the holding pin 7, which latter is engaging the teeth 3a. The new base jaw is then secured against flying out of the chuck body 1.

As soon as all base jaws 3 are in their correct position, the key rod teeth 4a of all the key rods 4 can be engaged with the corresponding teeth 3a of the base jaws 3. This is accomplished in the illustrated specific embodiment of the invention by turning an operating screw or spindle 14 which is tangentially arranged in the chuck body 1. The operating screw 14 is rotatably mounted in a bearing ring 15 and a bearing bushing 16 which can be screwed in. When turned, the operating screw 14 does not screw in or out. As shown in FIG. 1, screw 14 engages a key rod 4 with its threaded portion. The key rod 4, operated by the operating screw 14, drives the thrust ring 6 by means of its pin 4b and the slide ring 5. In this manner, the thrust ring 6, through the two other slide rings 5, moves the residual two key rods 4 in a tangential direction in the chuck body 1.

As soon as the key rods 4 have reached the passage section intended for chucking and disengaging, that is, their working range in which the key rod teeth 4a safely engage the teeth 3a of the base jaws 3, the push rods 12 arrive in the longitudinal grooves 4c which are in this area. At the same time, the balls 10 leave the region of the holding pin 7 so that the latter within the working range of the chuck, is continually pressed into the teeth 3a by means of the loaded spring 8. However, the holding pin 7 is also releasable by a movement of the base jaw 3 in the direction toward the cover 2. The radial adjustability of the clamping jaws is not impeded by the holding pin 7.

It is, of course, to be understood that the present invention is, by no means, limited to the specific showing of the drawings, but also comprises any modifications within the scope of the appended claims.

I claim:

1. A chuck for turning machines, which includes: a chuck body, a plurality of clamping jaws provided with teeth and radially movably supported by said chuck body, adjusting means respectively associated with said clamping jaws and selectively movable in said chuck body into a first section of its path of movement which first section represents the working range of said adjusting means for engagement with and adjustment of the pertaining clamping jaw, said adjusting means also being movable into a second section of its path of movement out of said working range to thereby disengage the respective pertaining clamping jaw and permit removal and exchange of the latter, a plurality of holding pin means respectively associated with said clamping jaws and operable to engage a tooth space of the pertaining clamping jaw for holding the same in its respective adjusted position, said holding pin means also being operable to disengage the tooth space of the pertaining clamping jaw to permit other adjustments and also the removal and exchange of the respective clamping jaw, and locking means operable automatically in response to said adjusting means occupying said second section to prevent withdrawal of said holding pin means from the respective tooth space of the teeth of the pertaining clamping jaw, said locking means including a manually operating means for making said locking means ineffective to thereby allow withdrawal of the respective holding pin means from the respective tooth space of the pertaining clamping jaw, each of said holding pin means having a shank provided with an annular groove, and said holding means including: a first member in the form of a cup having each of two diametrically oppositely located wall portions provided with a slot through which reciprocably extends the respective pertaining holding pin means, a second member arranged within said first member and reciprocable relative thereto, ball means supported by said second member and operable to enter said annular groove for locking the respective pertaining holding pin means, and spring means continuously urging said first and second members to occupy such relative positions with regard to each other as to keep said ball means in locking engagement with the annular groove of the pertaining holding pin means, said first member being provided with recess means arranged in diametrically opposite wall sections of said first member and offset in axial direction of said first member with regard to the position in which said ball means are in locking engagement with the annular groove of the pertaining holding pin means to thereby permit said holding pin means to press said ball means out of said annular groove into said recess means when moving said first member relative to said second member to a position in which said recess means register with said ball means.

2. A chuck according to claim 1, in which said cup-shaped first member has its bottom located near the periphery of said chuck body and accessible therefrom, and in which each of said locking means includes a pressure spring forming said spring means and being interposed between the bottom of said first member and said second member.

3. A chuck according to claim 1, in which said adjusting means is within the region of said first section only provided with a groove extending in the direction of the path of movement of said adjusting means and facing said second member, said second member being formed by a push rod having a portion facing said adjusting means and being adapted to enter groove when said adjusting means is in said first section.

4. A chuck according to claim 3, in which said ball means of each locking means includes two balls, and in which the pertaining push rod has a passage extending transverse to the axial direction of extension of the pertaining holding pin means for receiving and supporting said two balls.

5. A chuck according to claim 1, in which each of said pin means is substantially cylindrical, and in which said recess means in said first member is formed by a circular groove on the inside of the skirt of said cup-shaped first member.

* * * * *